United States Patent
Thomas (10) Patent No.: US 9,519,084 B1
(45) Date of Patent: Dec. 13, 2016

(54) SECURING A FRESNEL LENS TO A REFRACTIVE OPTICAL ELEMENT

(71) Applicant: Oculus VR, LLC, Menlo Park, CA (US)

(72) Inventor: Matt Lee Thomas, Buena Park, CA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 14/742,886

(22) Filed: Jun. 18, 2015

(51) Int. Cl.
*B29D 11/00* (2006.01)
*G02B 5/18* (2006.01)
*G02B 3/08* (2006.01)

(52) U.S. Cl.
CPC .............. *G02B 3/08* (2013.01); *B29D 11/0073* (2013.01); *B32B 2551/00* (2013.01)

(58) Field of Classification Search
CPC ........... G02B 3/08; G02B 5/18; G02B 5/1814; G02B 5/188; G02B 1/04; B29D 11/00269; B29D 11/0073; B29C 47/065; B29L 2009/00; B29L 2011/00; B32B 2551/00
USPC ........ 359/558, 576, 630, 742; 264/1.1, 1.32, 264/1.7
See application file for complete search history.

(56) References Cited

U.S. PATENT DOCUMENTS

2003/0030912 A1* 2/2003 Gleckman .......... G02B 27/0172
359/633

* cited by examiner

*Primary Examiner* — William Choi
(74) *Attorney, Agent, or Firm* — Fenwick & West LLP (57) ABSTRACT

A headset for virtual reality applications includes an optical element configured to modify light from an electronic display in the headset and to direct the modified light to a user. The optical element may include a Fresnel lens secured to a lens by securing the Fresnel lens to a mold and inserting a casting material into the mold so the casting material forms the lens and a portion of the casting material exists on and past an edge of the Fresnel lens. This encases the edge of the Fresnel lens in the casting material, securing the Fresnel lens to the lens.

11 Claims, 4 Drawing Sheets

SECURING A FRESNEL LENS TO A REFRACTIVE OPTICAL ELEMENT

BACKGROUND

This disclosure relates generally to manufacturing processes, and more specifically to securing a Fresnel lens to a refractive optical element.

Electronic displays include a plurality of pixels, which may each include a plurality of sub-pixels (e.g., a red sub-pixel, a green sub-pixel, etc.). Arrangement of individual sub-pixels may affect the appearance and performance of an electronic display device. Some arrangements of sub-pixels may increase fixed pattern noise under certain conditions. For example, magnification of a pixel may result in boundaries between individual sub-pixels of the pixel becoming visible to the user, resulting in a "screen door" pattern (i.e., an increase in fixed pattern noise) in an image presented to a user. While corrective optical elements may be used to reduce the effect of fixed pattern noise in content presented by the user, conventional corrective optical elements are difficult to rapidly manufacture. For example, certain types of corrective optical elements are lenses in which multiple grooves are etched, which precludes the lenses from being molded. The additional time and expense of etching grooves into the lenses after the lenses are molded increases the time and expense in producing these corrective optical elements.

SUMMARY

An optical element for viewing content presented via an electronic display includes a diffractive element, such as a Fresnel lens, that modifies light presented by the electronic display and directs the modified light to a user for presentation. For example, the Fresnel lens blurs light generated by different sub-pixels in an image presented by the electronic display to prevent the user from seeing dark space between the sub-pixels and a refractive optical element (e.g., a lens) directs the blurred light to a user's eye. The Fresnel lens includes a series of equally spaced grooves, with the distance between the grooves referred to as "pitch width." The pitch width determines the amount by which light from sub-pixels presented by the electronic display is blurred by the Fresnel lens. However, the grooves included in a Fresnel lens prevent the Fresnel lens from being fabricated via molding. Instead, a lens is initially generated via a molding process, and the grooves are subsequently etched into the lens to produce the Fresnel lens, which increases the time and complexity of generating the Fresnel lens.

To simplify production of the optical element for viewing content presented via the electronic display, a Fresnel lens or other suitable diffractive element is secured to a surface of a molding structure. For example, the Fresnel lens is secured to a surface of a molding structure through one or more pins inserted through an exterior portion of the Fresnel lens (e.g., a portion within a threshold distance of an edge of the Fresnel lens and outside of a field of view of a user) and into the surface of the molding structure. The exterior portion of the Fresnel lens may be an edge of the surface of Fresnel lens or a portion of the surface of Fresnel lens between a specified distance from the edge of the surface of Fresnel lens and the edge of the surface of the Fresnel lens (e.g., from the edge of the Fresnel lens to 0.1 millimeters from the edge of the Fresnel lens). In various embodiments, the exterior portion of the surface of the Fresnel lens is specified so that it is outside of a field of view of a user who views data through the Fresnel lens or through an optical element coupled to the Fresnel lens. After securing the Fresnel lens to the surface of the molding structure, the mold is assembled using one or more additional portions. For example, an additional portion of the molding structure is positioned relative to the portion of the molding structure to which the Fresnel lens is secured. In various embodiments, the additional portion of the molding structure is positioned so there is a specified distance between a surface of the Fresnel lens and an inner surface of the additional portion of the molding structure. Distances between different locations on the inner surface of the additional portion of the molding structure and a location on the surface of the Fresnel lens may differ in some embodiments, so different locations on the inner surface of the additional portion of the molding structure have different distances to the location on the surface of the Fresnel lens.

In some embodiments, when the mold is assembled, the assembled mold also has a specified distance between the surface of the Fresnel lens and an inner surface of the portion of the molding structure to which the Fresnel lens is secured. For example, the specified distance between the surfaces of the Fresnel lens and the inner surface of the portion of the molding structure is along an exterior portion of the surface of Fresnel lens from the surface of the Fresnel lens to the inner surface of the portion of the molding structure. The assembled mold may also have a distance between an exterior portion of an additional surface of the Fresnel lens that is parallel to the surface of the Fresnel lens (e.g., a surface of the Fresnel lens nearer to the molding structure) and the inner surface of the portion of the molding structure to which the Fresnel lens is secured, creating separation between the additional surface of the Fresnel lens and the inner surface of the molding structure between the edge of the Fresnel lens and a location on the additional surface of the Fresnel lens that is a specified distance from the edge of the Fresnel lens. Additionally, the exterior portion of the surface of Fresnel lens may include one or more openings extending from the surface of the Fresnel lens through the thickness of the Fresnel lens or through a portion of the thickness of the Fresnel lens.

A casting material, such as resin, that is transmissible to one or more wavelengths of light is inserted into the assembled mold, forming a layer between the additional portion of the molding structure and the surface of the Fresnel lens that has a thickness equaling the specified distance between the surface of the Fresnel lens and the inner surface of the additional portion of the molding structure. In some embodiments, the layer formed between the surface of the Fresnel lens and the inner surface of the additional portion of the molding structure creates a lens or other refractive element that affects the focusing of light passing through the layer. Distances between a location on the surface of the Fresnel lens and locations on the inner surface of the additional portion of the molding structure determine the curvature of the lens in various embodiments. If the assembled mold has a specified distance between the surface of the Fresnel lens and an inner surface of the portion of the molding structure to which the Fresnel lens is secured, inserting the casting material into the assembled mold forms a layer of the casting material between the surface of the Fresnel lens and the portion of the molding structure. For example, if the specified distance is along an exterior portion of the Fresnel lens from the surface of the Fresnel lens to the inner surface of the portion of the molding structure, a layer of the casting material is formed along the exterior portion of the Fresnel lens from the surface of the Fresnel lens to the inner surface of the portion of the molding structure. This encases the exterior portion of the Fresnel lens in the casting material from the surface of the Fresnel lens to the inner surface of the portion of the molding structure. In embodiments where the assembled mold has a distance between an exterior portion of an additional surface of the Fresnel lens that is parallel to the surface of the Fresnel lens (e.g., a surface of the Fresnel lens nearer to the molding structure) and the inner surface of the portion of the molding structure to which the Fresnel lens is secured, inserting the casting material into the assembled mold also generates a layer of casting material between the additional surface of the Fresnel lens and the inner surface of the molding structure. This layer of casting material secures the Fresnel lens to the layer of casting material between the surface of the Fresnel lens and the inner surface of the additional molding structure. Hence, the casting material forms a layer between the additional surface of the Fresnel lens and the inner surface of the molding structure extending an overlap distance from the edge of the Fresnel lens to a location on the additional surface of the Fresnel lens. In embodiments where the Fresnel lens includes one or more openings in the exterior portion of the surface of the Fresnel lens, inserting the casting material into the assembled mold causes the casting material to flow through the openings, forming molded pins. The assembled mold is subsequently removed after the casting material cures or hardens to produce an optical element where the Fresnel lens is secured to a refractive optical element, such as a lens, that directs light from the Fresnel lens to a user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Example Outer Shell

Figure 1A:
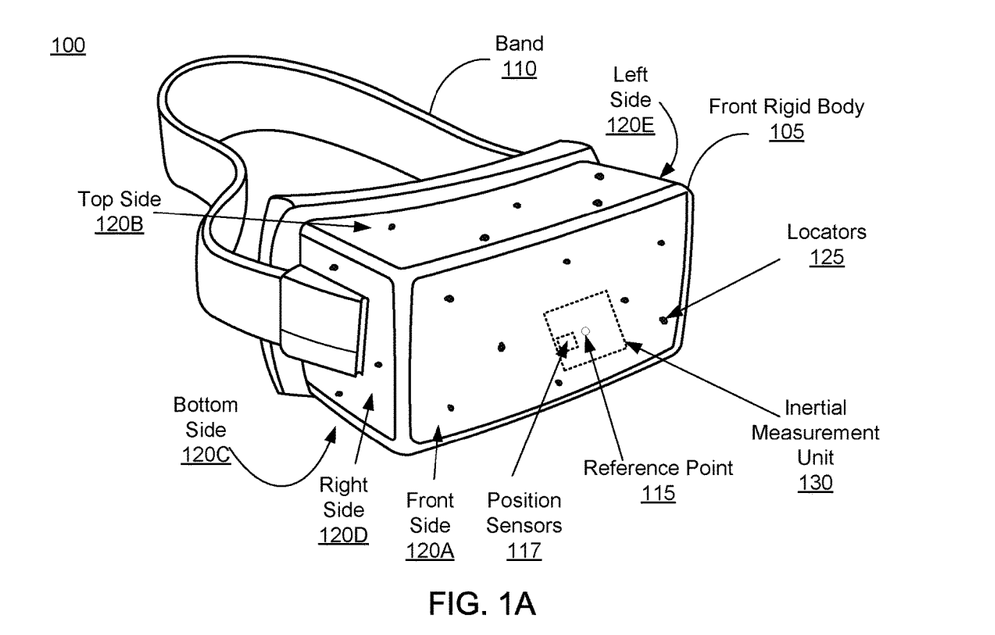
FIG. 1A is a wire diagram of a virtual reality (VR) headset, in accordance with an embodiment.

FIG. 1A is a wire diagram of a virtual reality (VR) headset, in accordance with an embodiment. The VR headset 100 includes a front rigid body 105 and a band 110. The front rigid body 105 includes one or more electronic display elements of an electronic display, and may include an inertial measurement unit (IMU) 130, one or more position sensors 117, and locators 125. In the embodiment shown by FIG. 1A, the position sensors 117 are located within the IMU 130, and neither the IMU 130 nor the position sensors 117 are visible to the user.

The locators 125 are located in fixed positions on the front rigid body 105 relative to one another and relative to a reference point 115. In the example of FIG. 1A, the reference point 115 is located at the center of the IMU 130. Each of the locators 125 emits light that is detectable by an imaging device. Locators 125, or portions of locators 125, are located on a front side 120A, a top side 120B, a bottom side 120C, a right side 120D, and a left side 120E of the front rigid body 105 in the example of FIG. 1A.

The IMU 130 is an electronic device that generates fast calibration data based on measurement signals received from one or more of the position sensors 117. A position sensor 117 generates one or more measurement signals in response to motion of the VR headset 100. Examples of position sensors 117 include: one or more accelerometers, one or more gyroscopes, one or more magnetometers, another suitable type of sensor that detects motion, a type of sensor used for error correction of the IMU 130, or some combination thereof. The position sensors 117 may be located external to the IMU 130, internal to the IMU 130, or some combination thereof.

Based on the one or more measurement signals from one or more position sensors 117, the IMU 130 generates fast calibration data indicating an estimated position of the VR headset 100 relative to an initial position of the VR headset 100. For example, the position sensors 117 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 100 from the sampled data. For example, the IMU 130 integrates the measurement signals received from the accelerometers over time to estimate a velocity vector and integrates the velocity vector over time to determine an estimated position of a reference point on the VR headset 100. Alternatively, the IMU 130 provides the sampled measurement signals to the VR console 110, which determines the fast calibration data. The reference point is a point that may be used to describe the position of the VR headset 100, such as the reference point 115. While the reference point 115 may generally be defined as a point in space, the reference point 115 is defined as a point within the VR headset 100 (e.g., a center of the IMU 130) in various embodiments.

The IMU 130 receives one or more calibration parameters from a virtual reality (VR) console and uses the one or more calibration parameters to maintain tracking of the VR headset 100. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Figure 1B:
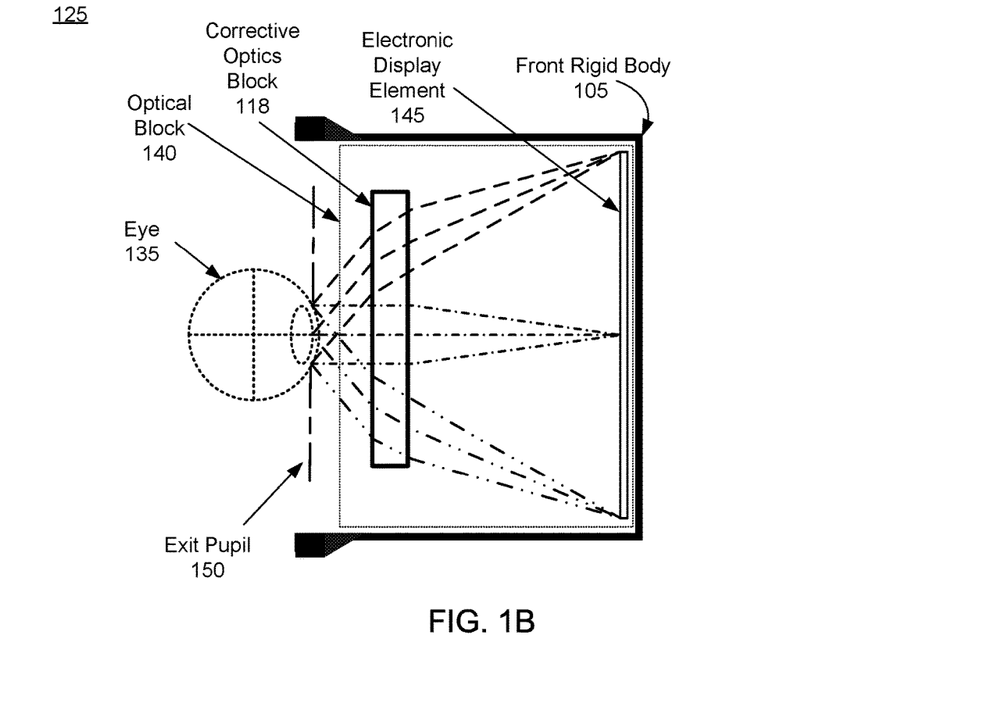
FIG. 1B is a cross section of a front rigid body of the VR headset in FIG. 1A, in accordance with an embodiment.

FIG. 1B is a cross section 125 of the front rigid body 105 of the embodiment of a VR headset 100 shown in FIG. 1A. As shown in FIG. 1B, the front rigid body 105 includes an optical block 140, which provides altered image light to an exit pupil 150. The exit pupil 150 is the location of the front rigid body 105 where a user's eye 135 is positioned. For purposes of illustration, FIG. 1B shows a cross section 125 associated with a single eye 135, but another optical block, separate from the optical block 140, provides altered image light to another eye of the user.

The optical block 140 includes an electronic display element 145 of an electronic display that projects image light toward the corrective optics block 118, which is included in the optical block 140 and alters the projected image. For example, the corrective optics block 118 magnifies and corrects optical errors associated with the projected image. The optical block 140 is configured to correct for fixed pattern noise by slightly blurring sub-pixels. The corrective optics block 118 directs the altered image light to the exit pupil 150 for presentation to the user.

The electronic display element 145 includes a display area comprising a plurality of sub-pixels, where a sub-pixel is a discrete light emitting component. Different sub-pixels are separated from each other by dark space. For example, a sub-pixel emits red light, yellow light, blue light, green light, white light, or any other suitable color of light. In some embodiments, images projected by the electronic display element 145 are rendered on the sub-pixel level. This is distinct from, say an RGB (red-green-blue) layout, which has discrete red, green, and blue pixels (red, green, and blue) and each pixel in the RGB layout includes a red sub-pixel, which is adjacent to a green sub-pixel that is adjacent to a blue sub-pixel; the red, green, and blue sub-pixels operate together to form different colors. In an RGB layout a sub-pixel in a pixel is restricted to working within that pixel. However, in some embodiments, sub-pixels in the electronic display element 145 operate within multiple "logical" pixels in their surrounding vicinity to form different colors. The sub-pixels are arranged on the display area of the electronic display element 145 in a sub-pixel array. Examples of a sub-pixel array include PENTILE® RGBG, PENTILE® RGBW, some another suitable arrangement of sub-pixels that renders images at the sub-pixel level.

The corrective optics block 118 includes one or more optical elements that adjust an image projected by the electronic display element 145 to the user by the VR headset 100. In some embodiments, the corrective optics block 118 is positioned at least 35 mm from the electronic display element 145. At least a portion of an optical element in the corrective optics block 118 includes a diffractive surface. In various embodiments, an optical element in the corrective optics block 118 includes a refractive surface (e.g., a concave surface), a diffractive surface (e.g., a Fresnel surface, a binary surface, some other type of diffractive element), or some combination thereof. Portions of the diffractive surface and/or the refractive surface may include a flat portion, a curved portion, or both. The diffractive surface of an optical element may be uniform or may have a higher density of grooves near the center of the optical element. A diffractive optical element is an optical element including at least a portion of a diffractive surface. Additionally, in some embodiments, an optical element may be an aperture, a filter, or any other suitable optical element that affects the image projected by the electronic display element 145. In some embodiments, one or more of the optical elements in the corrective optics block 118 may have one or more coatings, such as anti-reflective coatings.

The corrective optics block 118 magnifies image light projected by the electronic display element 145 and corrects optical errors associated with the image light. Magnification of the image light allows the electronic display element 145 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. However, magnification may cause an increase in fixed pattern noise, also referred to as the "screen door effect," which is a visual artifact where dark space separating pixels and/or sub-pixels of a display become visible to a user in an image presented by the display. For example, magnification without optical error correction may increase fixed pattern noise to the point where the projected image suffers from the screen door effect. In some embodiments, the corrective optics block 118 is designed so its effective focal length is larger than the spacing to the electronic display element 145, which magnifies the image light projected by the electronic display element 145. Additionally, in some embodiments, the amount of magnification may be adjusted by adding or removing optical elements.

The corrective optics block 118 may be designed to correct one or more types of optical error. Optical error may be fixed pattern noise (i.e., the screen door effect), two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. The corrective optics block 118 may correct for fixed pattern noise by slightly blurring the image of each sub-pixel so the blurred sub-pixels mask the dark space between the sub-pixels via a Fresnel lens or other diffractive surface. In some embodiments, the media provided to the electronic display element 145 for display is pre-distorted, and the corrective optics block 118 corrects the distortion.

Figure 2:
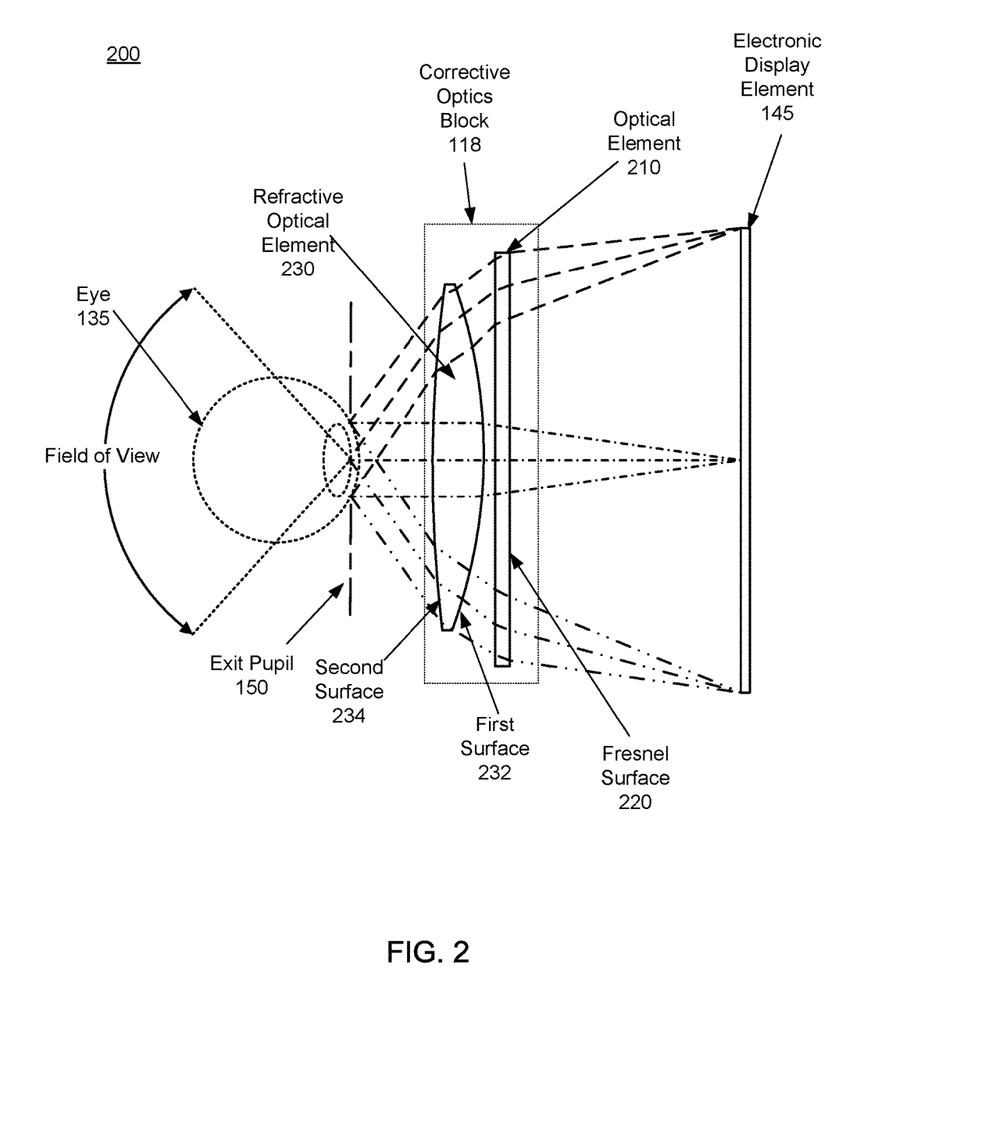
FIG. 2 is an optical block of a VR headset including a Fresnel lens and a refractive optical element, in accordance with an embodiment.

FIG. 2 is an example optical block 200 where the corrective optics block 118 includes an optical element 210 having a diffractive surface, such as a Fresnel surface 220, and a separate refractive optical element 230 (e.g., a lens). The optical element 210 and the separate refractive optical element 230 are shaped and positioned to magnify the electronic display element 145 and correct for fixed pattern noise, as well as correct for one or more additional optical errors. Because the optical block 200 shown in FIG. 2 has discrete refractive and diffractive elements, the optical block 200 is simpler to manufacture than an optical block combining the diffractive and refractive properties into a single optical element, which may result in difficulties in manufacturing and potential problems with glare. The Fresnel surface 220 of the optical element 210 is positioned to receive image light from the electronic display element 145 and generate blur spots, by diffracting image light from the electronic display element 145.

The refractive optical element 230 is a convex lens that provides the diffracted image light to an exit pupil 150. As shown in FIG. 2, the refractive optical element 230 includes a first surface 232 that receives diffracted light from the optical element 210 and a second surface 234 that directs the diffracted light toward an exit pupil 150. The first surface 232 and the second surface 234 have different curvatures, with the curvatures of the surfaces 232, 234 selected to direct the diffracted light to the exit pupil 150, to minimize introduction of optical error, to correct one or more optical errors, or to perform any suitable function.

Process for Securing a Fresnel Lens to a Lens

Figure 3:
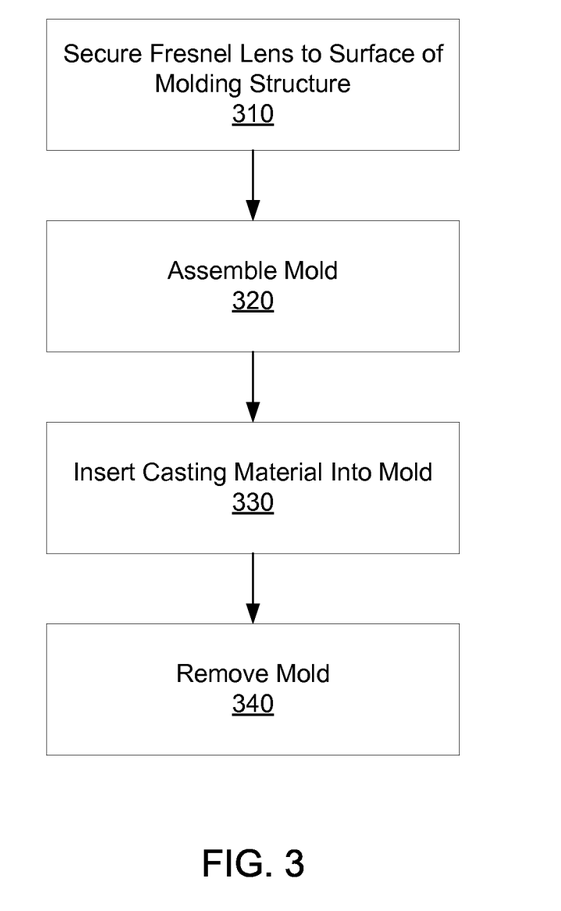
FIG. 3 is a flowchart of a method for securing a Fresnel lens to a refractive optical element, according to one embodiment.

FIG. 3 is one embodiment of a method for securing a Fresnel lens, or other diffractive surface, to a lens or other refractive optical element. In various embodiments, the method may include different and/or additional steps than those described in conjunction with FIG. 3. Additionally, in some embodiments, steps of the method may be performed in different orders.

Initially, a diffractive element, such as a Fresnel lens, is secured 310 to a surface of a molding structure. For example, the Fresnel lens is secured to a surface of a molding structure through one or more pins inserted through an exterior portion of the Fresnel lens (e.g., a portion within a threshold distance of an edge of the Fresnel lens) and into the surface of the molding structure. Alternatively, the Fresnel lens is secured 310 to a surface of the molding structure through suction (e.g., through creating a vacuum). For example, the surface of the molding structure includes one or more openings, allowing a pressure difference between the surface of the molding structure and another surface of the molding structure parallel to the surface to secure 310 the Fresnel lens to the surface of the molding structure (e.g., through creating a vacuum).

After securing 310 the Fresnel lens to the surface of the molding structure, the mold is assembled 320 using one or more additional portions. For example, an additional portion of the molding structure is positioned relative to the portion of the molding structure to which the Fresnel lens is secured 310. In various embodiments, the additional portion of the molding structure is positioned so there is a specified distance between a surface of the Fresnel lens and an inner surface of the additional portion of the molding structure. For example, the specified distance is between a center of the surface of the Fresnel lens and a specific location of the inner surface of the additional portion of the molding structure. In some embodiments, there are different distances between different locations on the surface of the Fresnel lens and different locations on the inner surface of the additional portion of the molding structure. Alternatively, the additional portion of the molding structure is positioned so a distance between the center of the surface of the Fresnel lens and various locations on the inner surface of the additional portion of the molding structure is constant (e.g., positioned so a semicircle with a specific radius from the center of the surface from the Fresnel lens is formed between the surface of the Fresnel lens and the inner surface of the additional portion of the molding structure).

In some embodiments, when the mold is assembled, the assembled mold has a specified distance between the surface of the Fresnel lens and an inner surface of the portion of the molding structure to which the Fresnel lens is secured 310. For example, the specified distance is along an exterior portion of the surface of Fresnel lens from the surface of the Fresnel lens to the inner surface of the portion of the molding structure. In some embodiments, the specified distance between the surface of the Fresnel lens and the inner surface of the portion of the molding structure to which the Fresnel lens is secured 310 is equal to the thickness of the Fresnel lens. Alternatively, the specified distance between the surface of the Fresnel lens and the inner surface of the portion of the molding structure to which the Fresnel lens is secured 310 is equal to the thickness of the Fresnel lens incremented by a value, so the specified distance is greater than the thickness of the Fresnel lens. The exterior portion of the Fresnel lens may be an edge of the surface of Fresnel lens or a portion of the surface of Fresnel lens between a specified distance from the edge of the surface of Fresnel lens and the edge of the surface of the Fresnel lens (e.g., from the edge of the Fresnel lens to 0.1 millimeters from the edge of the Fresnel lens). In various embodiments, the exterior portion of the surface of the Fresnel lens is specified so that it is outside of a field of view of a user who views data through the Fresnel lens or through an optical element coupled to the Fresnel lens.

The assembled mold may have a distance between the inner surface of the portion of the molding structure to which the Fresnel lens is secured and an exterior portion of an additional surface of the Fresnel lens that is parallel to the surface of the Fresnel lens (e.g., a surface of the Fresnel lens nearer to the portion of the molding structure). Hence, there is separation between the additional surface of the Fresnel lens and the inner surface of the molding structure between the edge of the Fresnel lens and a location on the additional surface of the Fresnel lens that is a specified distance from the edge of the Fresnel lens, also referred to as an "overlap distance." Additionally, the exterior portion of the surface of Fresnel lens may include one or more openings extending from the surface of the Fresnel lens through the thickness of the Fresnel lens or through a portion of the thickness of the Fresnel lens.

A casting material, such as resin, that is transmissible to one or more wavelengths of light is inserted 330 into the assembled mold. The casting material forms a layer between the additional portion of the molding structure and the surface of the Fresnel lens that has a thickness equaling the specified distance between the surface of the Fresnel lens and the inner surface of the additional portion of the molding structure. In some embodiments, the layer formed between the surface of the Fresnel lens and the inner surface of the additional portion of the molding structure creates a lens that affects the focusing of light passing through the layer. Distances between a location on the surface of the Fresnel lens and locations on the inner surface of the additional portion of the molding structure determine the curvature of the lens in various embodiments. Additionally, if the assembled mold has a specified distance between the surface of the Fresnel lens and an inner surface of the portion of the molding structure to which the Fresnel lens is secured 310, inserting 330 the casting material into the assembled mold forms a layer of the casting material between the surface of the Fresnel lens and the portion of the molding structure. For example, if the specified distance between the surface of the Fresnel lens and an inner surface of the portion of the molding structure to which the Fresnel lens is secured 310 is along an exterior portion of the Fresnel lens from the surface of the Fresnel lens to the inner surface of the portion of the molding structure, a layer of the casting material is formed along the exterior portion of the Fresnel lens from the surface of the Fresnel lens to the inner surface of the portion of the molding structure. This configuration encases the exterior portion of the Fresnel lens in the casting material from the surface of the Fresnel lens to the inner surface of the portion of the molding structure. In some embodiments, the assembled mold has a distance between an exterior portion of an additional surface of the Fresnel lens that is parallel to the surface of the Fresnel lens (e.g., a surface of the Fresnel lens nearer to the molding structure) and the inner surface of the portion of the molding structure to which the Fresnel lens is secured, so inserting 330 the casting material into the assembled mold also generates a layer of casting material between the additional surface of the Fresnel lens and the inner surface of the molding structure. Hence, the casting material forms a layer between the additional surface of the Fresnel lens and the inner surface of the molding structure extending an overlap distance from the edge of the Fresnel lens to a location on the additional surface of the Fresnel lens. If the Fresnel lens includes one or more openings in the exterior portion of the surface of the Fresnel lens, inserting 330 the casting material into the assembled mold causes the casting material to flow through the openings, which forms molded pins when the casting material cures. The assembled mold is subsequently removed 340 after the casting material cures or hardens to produce an optical element where the Fresnel lens is secured to a lens.

Figure 4A:
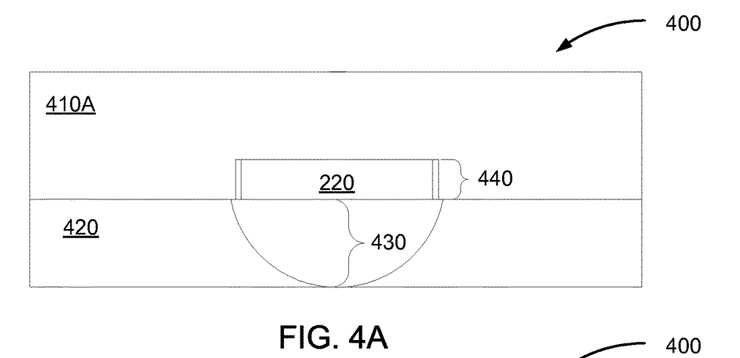
FIG. 4A is an example of securing a Fresnel lens to a mold, according to one embodiment.

FIG. 4A is an example of an assembled mold 400 with a Fresnel lens 220 secured to a surface of a portion of a molding structure 410A. The assembled mold 400 includes an additional molding structure 420 having a surface that is separated from a surface of the Fresnel lens 220 by a first specified distance 430. In the example of FIG. 4A, various locations along the surface of the additional molding structure 420 have a common distance from a location in the center of the surface of the Fresnel lens 220. Additionally, in the example of FIG. 4A, the assembled mold 400 has a second specified distance 440 between the surface of the Fresnel lens 220 and an inner surface of the portion of the molding structure 410A. For example, the second specified distance 440 is along an exterior portion of the surface of Fresnel lens 220 from the surface of the Fresnel lens 220 to the inner surface of the portion of the molding structure 410A. As described above in conjunction with FIG. 3, the exterior portion of the Fresnel lens 220 may be an edge of the surface of Fresnel lens 220 or a portion of the surface of Fresnel lens 220 between a specified distance from the edge of the surface of Fresnel lens 220 and the edge of the surface of the Fresnel lens 220 that is outside of a field of view of a user who views data through the Fresnel lens or through an optical element coupled to the Fresnel lens 220.

Figure 4B:
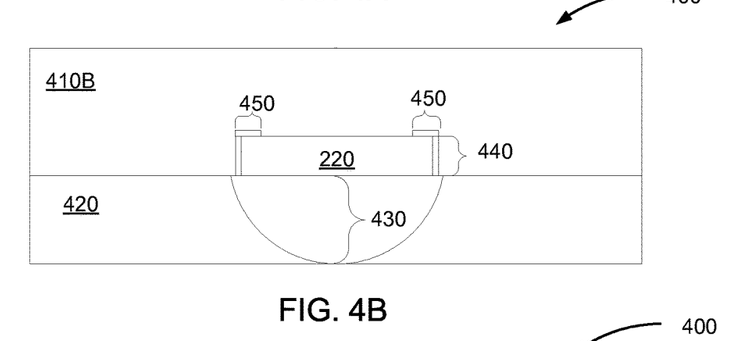
FIG. 4B is an additional example of securing a Fresnel lens to a mold, according to one embodiment.

FIG. 4B is an additional example of the assembled mold 400 with a Fresnel lens 220 secured to a surface secured to a surface of a portion of a molding structure 410B. As in the example of FIG. 4A, the assembled mold 400 includes an additional molding structure 420 having a surface that is separated from a surface of the Fresnel lens 220 by a first specified distance 430 and has a second specified distance 440 between the surface of the Fresnel lens 220 and an inner surface of the portion of the molding structure 410B. Additionally, the assembled mold 400 in FIG. 4B have a distance between the inner surface of the portion of the molding structure 410B and an exterior portion of an additional surface of the Fresnel lens 220 extending from the edge of the Fresnel lens 220 an overlap distance 450 into the additional surface of the Fresnel lens 220. This creates separation between the additional surface of the Fresnel lens 220 and the inner surface of the portion of the molding structure 410B along the overlap distance 450 between the edge of the Fresnel lens and a location on the additional surface of the Fresnel lens 220 that is a specified distance from the edge of the Fresnel lens 220.

Figure 4C:
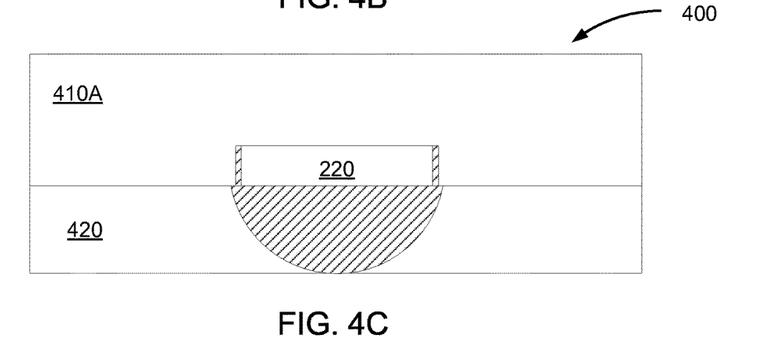
FIG. 4C is an example of inserting a casting material into a mold to which a Fresnel lens has been secured, according to one embodiment.
Figure 4D:
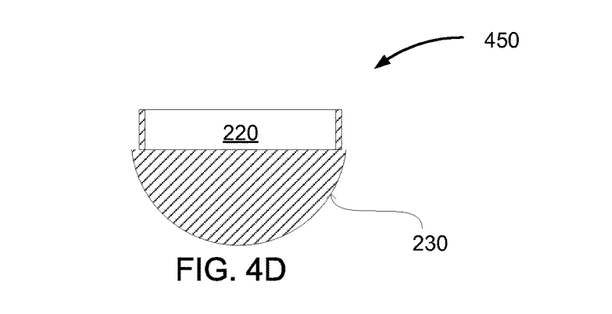
FIG. 4D is an example of a Fresnel lens secured to a refractive optical material generated by casting material, according to one embodiment.

FIG. 4C is an example of inserting a casting material into an assembled mold 400 to which a Fresnel lens has been secured, according to one embodiment. In FIG. 4C, a casting material, such as resin, is inserted into the assembled mold 400 shown in FIG. 4A. The casting material fills the first specified distance 430 between the surface of the Fresnel lens 220 and the surface of the additional portion of the molding structure 420 as well as the second specified distance 440 between the surface of the Fresnel lens 220 and the inner surface of the portion of the molding structure 410A. In other embodiments, inserting the casting material into the assembled mold 400 fills distances between the inner surface of the portion of the molding structure to which the Fresnel lens 220 is secured and an additional surface of the Fresnel lens 220, such as distances between the additional surface of the Fresnel lens 220 and the inner surface of a molding structure 410B along the overlap distance 450 shown in FIG. 4B. After the casting material has set, cured, or hardened, FIG. 4D shows an optical element 450 including the Fresnel lens 220 secured to a refractive optical element 230 formed by the cured casting material.

Securing the Fresnel lens to a portion of a surface of a molding structure and subsequently inserting casting material into an assembled mold inclosing the molding structure and the Fresnel lens allows the Fresnel lens to be secured to a refractive optical element, such as a lens, produced when the casting material cures. Separation between regions of the Fresnel lens and the surface of the molding structure allows the casting material to encase portions of the Fresnel lens (e.g., an edge of the Fresnel lens, an amount of the Fresnel lens between the edge and a specified distance from the edge), which secures the Fresnel lens to the refractive optical element generated when casting material between a surface of the Fresnel lens and a surface of a portion of an additional molding structure cures. While the preceding examples describe securing a Fresnel lens to a refractive optical element, in other embodiments, any suitable diffractive optical element may be secured to the portion of the surface of the molding structure and casting material inserted into an assembled mold including the diffractive optical element and the molding structure, as described above in conjunction with FIGS. 2-4D.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:
1. A method comprising:
   securing a diffractive element to a portion of a surface of a portion of a molding structure;
   assembling the portion of the molding structure and an additional portion of the molding structure to form an assembled mold, the assembled mold having a first specified distance between a surface of the diffractive element and an inner surface of the additional portion of the molding structure and having a second specified distance between the surface of the diffractive element and an inner surface of the portion of the molding structure along an exterior portion of the diffractive element; and inserting a casting material into the assembled mold to form a layer filling the first specified distance between the surface of the diffractive element and the inner surface of the additional portion of the molding structure and another layer filling the second specified distance between the exterior portion of the surface of the diffractive element and the inner surface of the portion of the molding structure.

2. The method of claim 1, wherein the casting material is resin.

3. The method of claim 1, wherein the exterior portion of the surface of the diffractive element includes one or more openings for creating molded pins when the casting material is inserted into the assembled mold.

4. The method of claim 1, wherein the second specified distance between the surface of the diffractive element and the inner surface of the portion of the molding structure along the exterior portion of the diffractive element is equal to a thickness of the diffractive element.

5. The method of claim 1, wherein the second specified distance between the surface of the diffractive element and the inner surface of the portion of the molding structure along the exterior portion of the diffractive element is equal to a thickness of the diffractive element and a value.

6. The method of claim 1, wherein the assembled mold has a distance between an additional surface of the diffractive element that is parallel to the surface of the diffractive element and the inner surface of the portion of the molding structure, the distance extending an overlap distance from an edge of the diffractive element into the additional surface of the diffractive element.

7. The method of claim 6, wherein inserting a casting material into the assembled mold further forms a layer between the additional surface of the diffractive element and the inner surface of the portion of the molding structure along the overlap distance.

8. The method of claim 1, wherein the exterior portion of the diffractive element is located outside of a field of view of a user viewing content through the diffractive element.

9. The method of claim 1, wherein the layer between the surface of the diffractive element and the inner surface of the additional portion of the molding structure comprises a lens.

10. The method of claim 1, wherein the diffractive element is secured to the portion of the surface of the molding structure by inserting one or more pins through the exterior portion of the diffractive element.

11. The method of claim 1, wherein the diffractive element comprises a Fresnel lens.

* * * * *